United States Patent [19]

Osuna-Diaz

[11] 4,434,053
[45] Feb. 28, 1984

[54] TWO-STAGE FILTER FOR INJECTION MOLDING MACHINE

[76] Inventor: J. M. Osuna-Diaz, 908 Ravine Ter. Ct., Rochester, Mich. 48067

[21] Appl. No.: 395,635

[22] Filed: Jul. 6, 1982

[51] Int. Cl.³ .............................................. B01D 35/02
[52] U.S. Cl. ..................................... 210/446; 425/199; 425/568
[58] Field of Search ............... 210/418, 430, 435, 446, 210/449, 455, 773, DIG. 15; 425/197, 199, 564, 566, 568

[56] References Cited

U.S. PATENT DOCUMENTS

| | | | |
|---|---|---|---|
| 1,335,899 | 4/1920 | Kahlenberg | 210/446 |
| 1,802,423 | 4/1931 | Hemmingsen | 210/446 |
| 2,304,492 | 12/1942 | Aue et al. | 210/446 |
| 2,895,167 | 7/1959 | Paggi | 425/197 |
| 3,767,056 | 10/1973 | Neuman | 210/418 |
| 3,825,123 | 7/1974 | Neuman | 210/446 |
| 4,097,216 | 6/1978 | Putkowski | 210/446 |
| 4,280,908 | 7/1981 | Lord et al. | 210/446 |
| 4,373,895 | 2/1983 | Yamamoto et al. | 425/197 |

FOREIGN PATENT DOCUMENTS 801249 9/1958 United Kingdom ................ 210/446

Primary Examiner—Charles N. Hart
Assistant Examiner—John W. Czaja
Attorney, Agent, or Firm—John R. Benefiel

[57] ABSTRACT

A filter for removing solid contaminants from plastic melt as well as homogenizing the plastic melt prior to injection, including a generally cylindrical filter screen having an inlet passage receiving the unfiltered plastic melt. Axially arranged series of relatively large diameter holes extend between the inlet passage and filter grooves formed in the surface of the filter screen. A first stage, coarse filtration is achieved by flow through the holes radially outwardly from the inlet passage into each of the filter grooves. A second stage, fine filtration occurs by flow from the filter grooves through circumferential clearance spaces located between each of several lands separating the filter grooves and the interior of the filter cavity. Filtered plastic is collected in axially extending discharge grooves also formed in the filter screen surface intermediate the pairs of filter grooves. Each discharge groove is in communication with a discharge passage collecting the flow of filtered plastic melt from each of the discharge grooves. Flow through the clearance spaces and discharge grooves affords linear flow paths, enhancing the homogeneousness of the plastic melt and uniformity of density in the molded product.

8 Claims, 4 Drawing Figures

TWO-STAGE FILTER FOR INJECTION MOLDING MACHINE

BACKGROUND DISCUSSION

This invention concerns filters and more particularly filters adapted to filter melted plastic in injection molding machines.

It often occurs that melted plastic becomes contaminated with various foreign objects and material such as scrap metal, floor sweepings, etc., and the presence of such foreign objects in the melted plastic can lead to loss of production due to their containment in the molded parts, and also create other problems as by lodging of the particles in the mold or cavities, tending to block flow.

There has thus heretofore been provided filters to filter the plastic melt prior to injection into the mold. A known filter design consists of a filter screen plug having a central cavity which receives the melt and is also provided with an axial series of tapered filter holes. The melted plastic passes through the holes and into an outer annular discharge chamber. The filtered melt is then collected and redirected into a central passage in communication with the injection passage of a nozzle. Examples of this design are shown in U.S. Pat. Nos. 3,767,056 and 3,825,123.

There are also injection molding filters which employ flat screens to filter the plastic.

Such injection molding filters are in widespread use and do serve to greatly reduce the incidence and severity of problems associated with foreign material in the plastic melt.

Such arrangements, however, do inherently involve flow through relatively small diameter holes. That is, hole diameters on the order of 0.020 to 0.040 inches in diameter are typical depending on the degree of coarseness or fineness of the particular filtering action required.

Usage of such fine holes makes cleaning of the filter screen relatively difficult. The screen must periodically be cleaned in order to restore full-flow to the filter since the particles collected in the filter tend to plug up these holes.

An additional factor is the substantial pressure drop caused by filter holes interposed in the flow path to the injector nozzle, necessitating higher pressures to properly carry out injection.

A characteristic of the tubular type filter screens of the type disclosed in the aforementioned patents is a relatively large diameter annular clearance space between the tubular screen and an outer filter body. This relatively large diameter annular chamber is subjected to high injection pressures and necessitates a relatively large diameter main body to withstand these pressures, increasing the bulk of the filter unit.

The arrangement also involves a necessary recollecting of the flow in an annular passage so as to enable it to be directed into the injection nozzle passage, increasing the complexity of the components.

Another problem involved in the injection molding process is concerned with the need to maximize the homogeneousness of the melt. The melting plastic, depending on the source and the make-up of the feed stock, tends to vary in density. It has been found that the extent of linear or laminar flow to the point of injection tends to improve the uniformity of the melt and the resulting uniformity in density of the molded product. Turbulent or tortuous flow tends to aggravate the problem of lack of uniformity. The use of a large number of fine pores tends to induce turbulent flow and thus does not serve as an aid to improve homogeneousness, indeed tends to worsen the problem.

Accordingly, it is an object of the present invention to provide a filter for injection molding machines which avoids the use of very small diameter holes for the primary filtration process such as to minimize the pressure loss in the filter, as well as to allow easier cleaning of the filter.

It is yet another object of the present invention to provide a filter for injection molding machines in which a high degree of laminar flow through the unit is induced to improve the homogeneousness of the melted plastic.

It is still another object of the present invention to provide such filter which is of simple configuration such as to be able to be manufactured at relatively low cost.

It is still another object of the present invention to provide such a filter arrangement in which the filter size is minimized due to a reduction in pressure forces acting thereon over the previously heretofore known tubular type injection filters.

SUMMARY OF THE INVENTION

These and other objects of the present invention are achieved by a tubular type filter consisting of a main body having an internal bore receiving a generally cylindrical filter screen. An internal passage is formed into one end of the filter screen which receives the melted plastic under pressure.

The filter screen is provided with a series of circumferentially spaced axially extending filter grooves and discharge grooves, each formed into the outer surface thereof.

Each of the filter grooves are placed into communication with the inlet passage by means of a series of holes disposed along the length of the grooves. These holes are relatively large diameter to provide a coarse first stage filtering action.

The remaining grooves consist of discharge grooves and are each placed in communication with the filter grooves by means of a slight linear clearance formed by a relief of the lands interposed between the filter grooves and the discharge grooves.

Circumferential flow through the clearance spaces provides a relatively fine second stage filtering action. For this purpose, the clearance space is sized on the order of 0.020 to 0.040 inches depending on the fineness of the filtering action required.

Each of the discharge grooves is in communication with an outlet passage which is in communication with each discharge groove and with a central discharge opening formed at the opposite end of the filter screen from the inlet passage.

The flow from the filter grooves into the discharge grooves as well as down each of the discharge grooves is essentially linear and thus enhances the homogenizing of the melted plastic prior to discharge to the injection nozzle.

The filter screen is retained within the main body by means of a retainer endplug threaded into the end face of the main body and having a face in abutment with the end face of the filter screen and having a central opening aligned with the discharge passage of the filter screen. The end plug in turn is adapted to mount the injection nozzle as to enable flow of the melted plastic into the injection nozzle.

The filter grooves provide a relatively large capacity reservoir for containing the filtered particles between cleanings of the plug screen.

The particular filter screen disign does not necessitate an annular flow passage in the main body since the outlet flow is through the discharge grooves and the interposed full diameter lands are tightly fit within the main body filter cavity. Accordingly, the fluid pressure forces exerted on the main body are minimized so that the size of the main body may be reduced over the prior art designs described above.

The arrangement is relatively simple in configuration and may be manufactured at relatively low cost.

DETAILED DESCRIPTION

In the following detailed description certain specific terminology will be employed for the sake of clarity in a particular embodiment described in accordance with the requirements of 35USC112, but it is to be understood that same is not intended to be limiting and indeed should not be so construed inasmuch as the invention is capable of taking many forms and variations within the scope of the appended claims.

Figure 1:
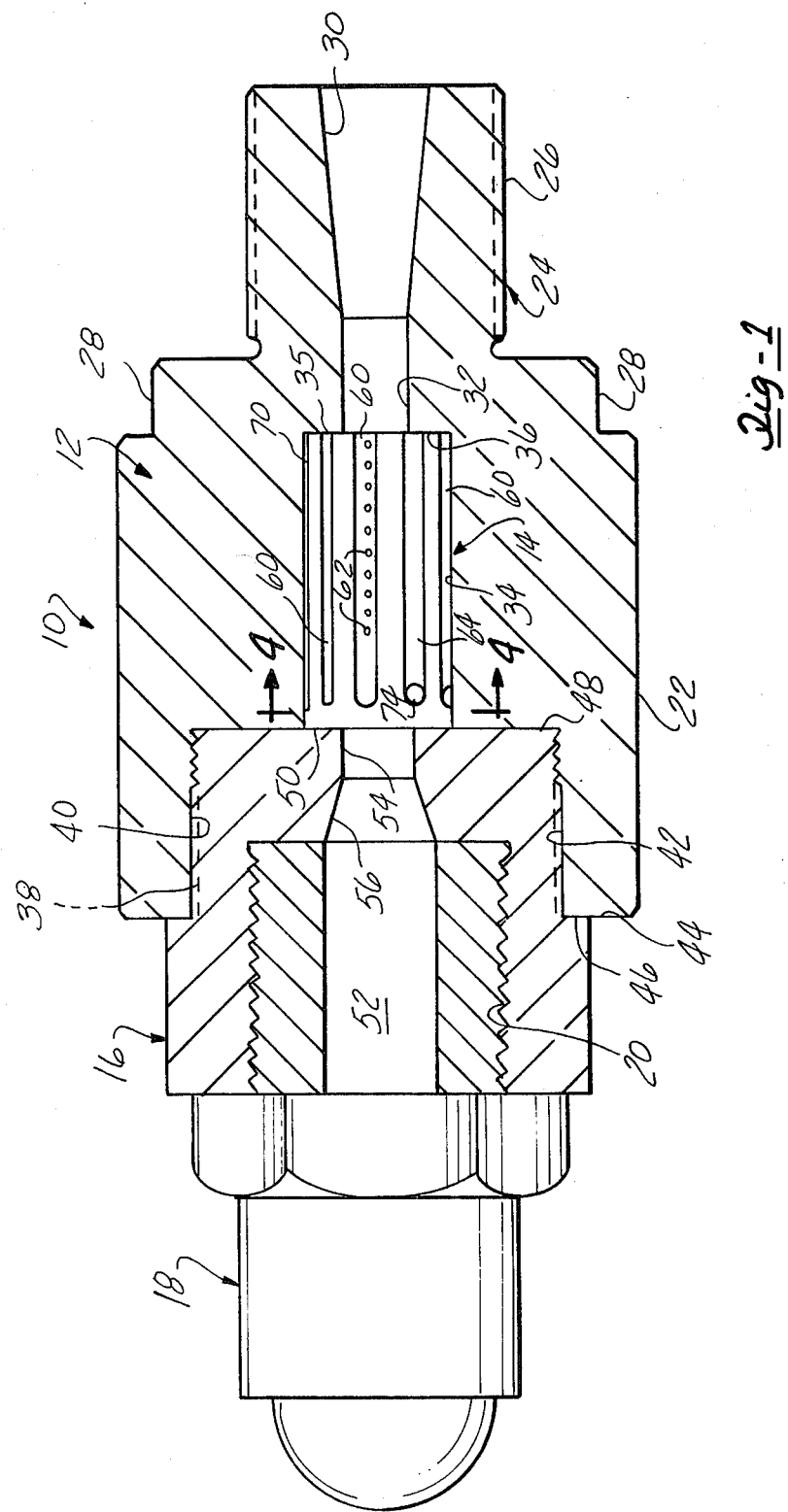
FIG. 1 is an enlarged view in partial longitudinal section of a filter assembly according to the present invention, shown with an installed injection nozzle.
Figure 2:
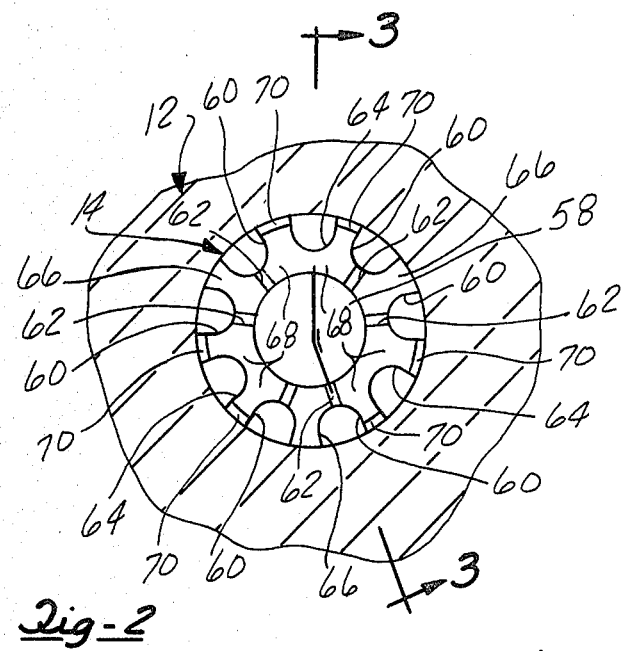
FIG. 2 is a fragmentary sectional view taken along the lines 2—2 in FIG. 1.

Referring to the drawings, and particularly FIG. 1, it can be seen that the filter assembly 10 according to the present invention consists of a main body 12, a generally cylindrical filter screen 14, and an endplug 16. An injection nozzle 18 of conventional construction is adapted to be threadably received within the endplug 16 within a threaded bore 20.

The main body 12 is also of a generally cylindrical configuration and is formed with a relatively large diameter section 22 and a projecting reduced diameter end portion 24 having an external thread 26 formed thereon for suitable connection into the injection molding machine in conventional fashion.

Suitale holding fats 28 are formed into a large diameter section 22 immediately adjacent the end portion 24 for purposes of establishing a threaded connection.

The main body 12 is formed with an inlet consisting of a gradually converging internal bore 30 extending into one side of the main body 12, passing into a straight sided internal passage bore 32.

A relatively larger diameter round bore is also formed therein defining a filtering cavity 34 which receives the filter screen 14. The filter screen 14 is generally cylindrical and adapted to have one endface 35 abut against a shoulder 36 formed by the different diameter of the filter cavity bore 34 and the straight sided section 32 of the inlet.

The end plug 16 is formed with an external thread 38 in turn mating with an internal thread 40 formed into a bore 42 extending to the opposite end of the main body 12 from the inlet passage.

The end plug 16 has a shoulder 44 seating against the endface 46 of the other end of the main body 12 upon advancement of the threaded connection therebetween. In the full seated position an end face 48 of the end plug 16 is seated against the endface 50 of the filter screen 14 thus positioning the filter screen 14 securely located within the filter cavity 34.

The end plug 16 is also formed with an internal outlet passage 52 which receives the filtered flow of the melted plastic.

The flow of plastic enters through the inlet bore 30, thence flows through the filter cavity 34, being filtered by flow about certain features of the filter screen 14, as will be hereafter described, thence into the passage 52 of the end plug 16, melted plastic passes via bore 54 and diverging section 56. The flow of filtered plastic then passes into the injection nozzle internal passages (not shown), in conventional fashion.

According to the concept of the present invention, filtering is accomplished in a two stage action, i.e., initial coarse filtering, with a subsequent fine filtering. The filtering flow of the plastic also acts to homogenize the plastic melt.

Extending into one end of the filter screen 14 for a portion of its length is an interior inlet passage 58, which receives flow from the inlet passage 32.

As noted above, the filter screen 14 is of generally cylindrical configuration having a series of circumferentially spaced axially extending grooves formed or machined into its outer surface and extending for a portion of the length of the filter screen 14.

Several of these, i.e., grooves 60 act as filtering grooves and receive flow passing from the central inlet passage 58 radially outward through a respective series of relatively large diameter holes 62 axially spaced along each filtering groove 60, and which extend from the central inlet passage 58 into the bottoms of the filtering grooves 60.

Flow of plastic through these holes produces the first stage or coarse filtering. For this purpose, the holes 62 are typically sized to have a diameter on the order of 1/16 of an inch.

Each of the series of holes 62 distributed along the length of a respective filtering groove 60, such that flow more or less uniformly enters the respective filtering grooves 60 along the full lengths thereof.

The remaining or discharge grooves 64 function to collect the filtered plastic after the final filtration stage. The second or final filtration stage consists of circumferential flow from each of the filtering grooves 60 through a radial clearance space 70 between the interior surface of the filter cavity 34 and the outside surface of the filter screen 14 into one of the discharge grooves 64.

The filtering and discharge grooves 60 and 64 are interspersed with circumferentially spaced lands. Three of the lands, i.e., lands 66, are of full diameter such as to be relatively tightly fit within the filter cavity 34 and thus preclude the flow past the lands. The remaining lands 68 are of lesser diameter than the filter cavity 34 such as to establish the radial clearance spaces 70.

The radial dimension of the clearance spaces is selected according to the filtering requirements of the particular application. In the preferred form for typical applications, this dimension will be either 0.020 or 0.040 inches, depending on the fineness of filtering action required.

The presence of the radial clearance spaces 70 establishes the second stage filtering flow from each of the filtering grooves 60, circumferentially past the undersized lands 68 and through the clearance space 70 into the collection or discharge grooves 64.

The flow is across the length of each of the lands 68 such as to establish linear or non-turbulent flow therethrough such that in addition to filtering of the plastic melt, there is achieved an improved homogeneousness.

This effect is further enhanced by laminar flow down the length of each of the discharge grooves 64.

In the second stage filtering, the clearance spaces 70 are sufficiently small that the particles to be filtered will not pass through and instead accumulate in the filter grooves 60. The filter grooves 60 provide relatively large volume space for the accumulation of the filtered particles.

Figure 3:
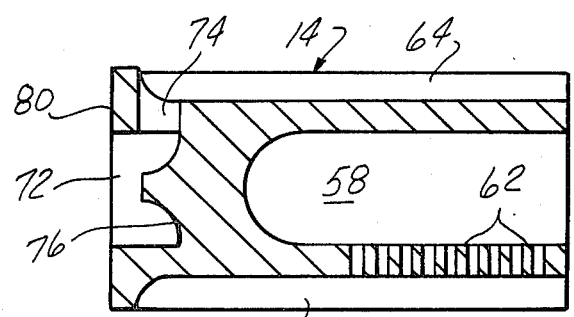
FIG. 3 is a view of the section 3—3 taken in FIG. 2.
Figure 4:
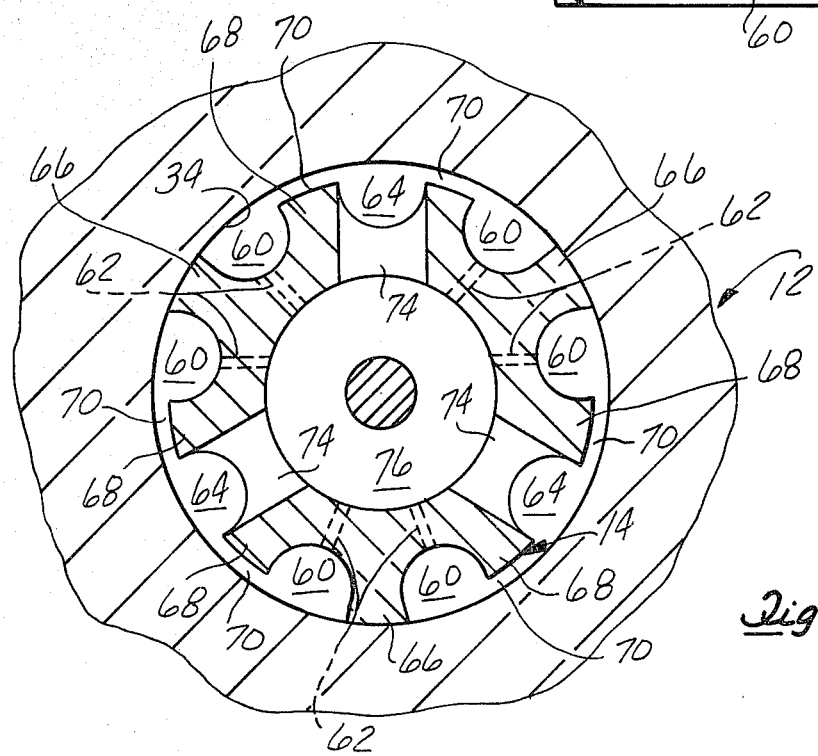
FIG. 4 is an enlarged sectional view taken along the lines 4—4 of FIG. 1.

Each of the discharge grooves 64 is in communication at its opposite end thereof from the inlet side of the filter screen 14 which an annular outlet space 72 (FIG. 3) by means of a large diameter bore 74 extending radially into the annular space 72.

The annular outlet space 72 is formed in part by a radiused groove 76 providing a smooth transition of radial flow to axial, to be directed into the outlet passage 54, minimizing the pressure losses and turbulence induced in the flow of plastic melt.

Accordingly, it can be appreciated that a two-stage filtering action is achieved in which the plastic melt is first caused to pass through relatively large diameter, coarse filtering holes 62 thence more finely filtered by passing through circumferential clearance spaces between the reduced diameter lands 69 and the interior of the filtering cavity 34. The nature of the flow through the filter is such as to induce linear or laminar flow by passing through the circumferential clearance spaces and down the lengths of the discharge grooves 64, such as to maximize the homogeneousness of the plastic melt and the resultant uniform density of the molded product.

The nature of the fine filtering spaces, i.e., the circumferential clearance spaces 70, is such as to minimize the clogging thereof and the collection of the filtering grooves 60 provide a considerable space for accumulation of filtered particles.

The filter screen element 14 is easily cleaned upon being removed from the main body 12. The holes 62 are relatively large in diameter and relatively easily cleaned as opposed to the finely sized pores of conventional filters, which tend to be clogged and difficult to clean as per the prior art practice.

It can be appreciated that the two stage filtration is more effective filtration in that it achieves separation of the larger particles or contaminates prior to the final filtration stage since the smaller clearance spaces thus do not tend to be clogged by the larger diameter particles. This also produces less back pressure or resistance to flow past the filter screen 14. The relative reduced turbulence of the filtering flow produces a more consistent or uniform density of the molded product.

The linear flow also produces a more uniform temperature of the filter material for a more consistent molding distribution in the mold cavities.

The filter is relatively simple, trouble-free and able to withstand the relatively high pressures of injection molding.

In connection with this feature it is noted that the body 12 can be of lesser diameter than the prior art arrangements which incorporate an annular discharge chamber extending completely about the filtering element.

According to the present invention, the discharge flow is through the discharge grooves formed in the filtering screen 14 itself.

The geometry of the parts is also simplified by the outlet flow occurring down the discharge grooves since the flow is directed into the injector through the radially extending flow passages in the main body 12 and the end plug 16.

I claim:

1. A filter arrangement for an injection molding machine comprising:

a main body having an internal bore formed therein defining a filter cavity;

a filter screen received within said filter cavity;

said filter screen generally cylindrical to be interfit within said filter cavity and wherein said filter cavity is correspondingly cylindrically shaped; said filter screen being formed with at least one filter groove formed into the periphery of said filter screen and extending axially for a portion of the length of said filter screen, and a discharge groove circumferentially spaced from said at least one filtering groove, said discharge groove formed into the periphery of said filter screen and extending axially along a portion of the length of said filter screen, said at least one filter groove and said at least one discharge groove being separated by an axially extending land, said land being radially spaced to form a circumferentially extending clearance space; inlet passage means including an interior inlet passage extending for a portion of the length of said filter screen;

an outlet passage means including at least one discharge groove;

said inlet passage and outlet passage means each in communication with said at least one filter groove, discharge groove, and circumferentially extending clearance space to define a flow path through said filter with filtration occurring by flow therethrough;

and further including a series of through holes extending between said at least one filter groove and said inlet passage, whereby a two-stage filtering action is enabled by flow through said holes into said filter groove thence through said clearance space into said discharge groove; and wherein said through holes are of larger diameter than the distance across said at least one clearance space, whereby a coarse filtering action is achieved by flow through said large diameter holes into said filter grooves and a fine filter action achieved by flow from said filter groove through said clearance space and into said discharge groove.

2. The filter arrangement according to claim 1 wherein said filter screen element includes an outer surface portion, and wherein said at least one clearance space comprises a circumferentially extending radial clearance space located between said outer surface portion formed on said filter screen and an internal surface of said filter cavity formed in said main body.

3. The filter arrangement according to claim 1 wherein said through holes are of a diameter on the order of 1/16 inch, and said clearance space is within the range of approximately 0.020 to 0.040 inches.

4. The filter arrangement according to claim 1 wherein said filter screen inlet passage enters into one end of said filter screen and extends for a portion of the length of said filter screen and said discharge groove and wherein the opposite end of said filter screen is formed with an outlet bore in communication and forming a part of said outlet passage means and wherein said at least one discharge groove is formed with a through opening extended from the opposite end of said discharge groove from the end of said filter element whereat said inlet passage enters to establish flow therethrough.

5. The filter arrangement according to claim 1 wherein a plurality of filter grooves are formed into said filter element and a plurality of discharge grooves, each discharge groove having a pair of filter grooves extending along either side thereof including sets of immediately adjacent circumferential spaced filter grooves interposed by sealing lands, said sealing lands being of substantially the same diameter as said filter cavity whereby to preclude flow across said lands and between adjacent filter grooves.

6. The filter arrangement according to claim 1 wherein said main body is formed with an internally threaded opening in the opposite one end and with an externally threaded cylindrical projection from the other end with a main body portion located intermediate, said main body portion formed with said cylindrical bore comprising said filter cavity, wherein said externally threaded projection is formed with an internal passage defining said inlet passage means and wherein said filter screen is slidably received into said filter cavity with said inlet passage in alignment with said internal passage and wherein the internally threaded opening of said main body receives a threaded end plug adapted to have an endface in abutment with an endface of said filter screen with said end plug in the installed position;

said end plug being formed with an outlet with an internal passage defining in part said outlet passage means and in alignment with said outlet passage of said filter screen.

7. The filter arrangement according to claim 1 wherein said outlet passage includes a generally annular opening transitioning into said outlet passage wherein each of said at least one discharge passage through bore is in registry with said central portion of said annular passage, and wherein said annulus is formed with a central protuberance, and a groove having a radiused sidewall whereby a smooth transitional flow through said bores and out through said outlet passage is insured.

8. The filter arrangement according to claim 5 comprising six of said filter grooves, and three of said discharge grooves circumferentially spaced about the axis of said filter screen, between each of said discharge grooves is formed a pair of filter grooves with said sealing lands intermediate each pair of filter grooves and wherein said spaced lands are provided intermediate the discharge grooves and the next circumferentially adjacent filter groove.

* * * * *

UNITED STATES PATENT AND TRADEMARK OFFICE
CERTIFICATE OF CORRECTION

PATENT NO. : 4,434,053
DATED : February 28, 1984
INVENTOR(S) : J. M. Osuna-Diaz

It is certified that error appears in the above-identified patent and that said Letters Patent are hereby corrected as shown below:

Column 3, line 51, "Suitale" should be --Suitable--;

Column 3, line 51, "fats" should be --flats--.

Signed and Sealed this

Thirtieth Day of October 1984

[SEAL]

Attest:

Attesting Officer

GERALD J. MOSSINGHOFF

Commissioner of Patents and Trademarks